Oct. 16, 1945.   A. F. HORLACHER   2,387,073
ROTOR FOR ELECTRIC MOTORS
Filed Oct. 8, 1943   2 Sheets-Sheet 1
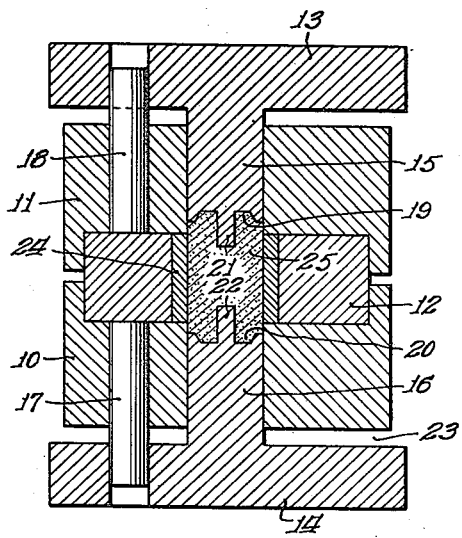
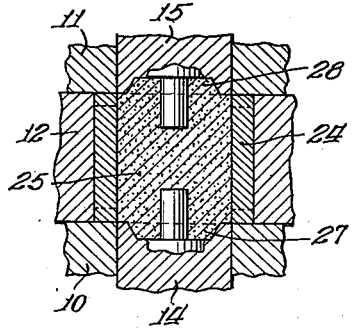
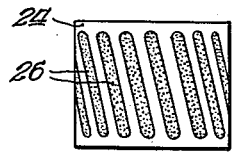
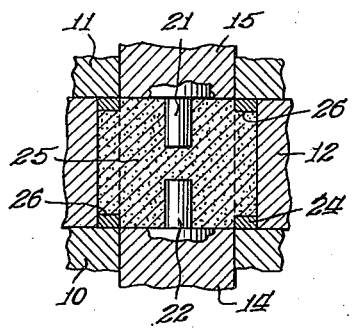
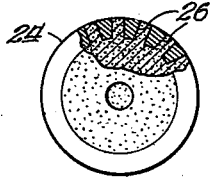
Inventor:
Albert F. Horlacher Oct. 16, 1945.    A. F. HORLACHER    2,387,073
ROTOR FOR ELECTRIC MOTORS
Filed Oct. 8, 1943    2 Sheets-Sheet 2
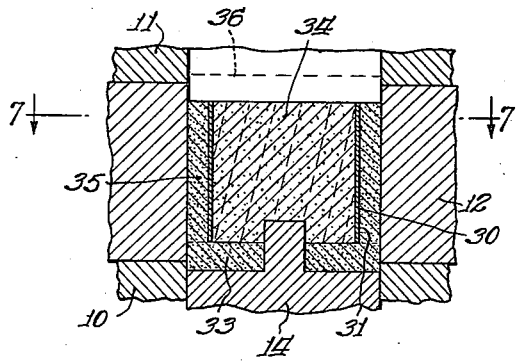
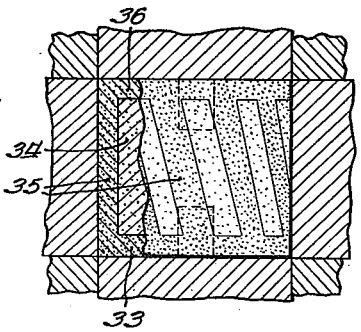
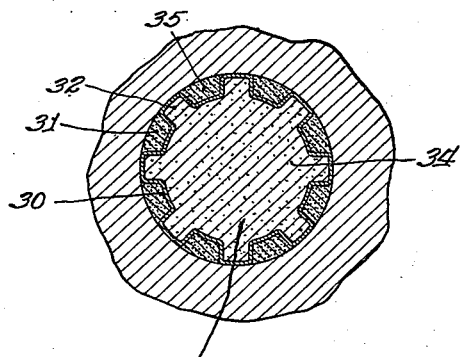
SLIGHTLY OXIDIZED IRON POWDER
IRON POWDER PARTICLES CERAMIC COATED
IRON POWDER 95%
SILICON POWDER 5%
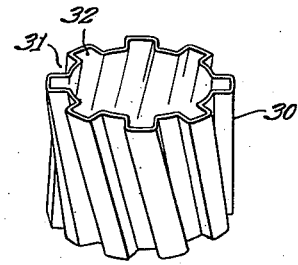
Inventor:
Albert F. Horlacher Patented Oct. 16, 1945

2,387,073

UNITED STATES PATENT OFFICE 2,387,073

ROTOR FOR ELECTRIC MOTORS

Albert F. Horlacher, Palatine, Ill., assignor to C. P. Clare & Co., Chicago, Ill., a corporation of Illinois Application October 8, 1943, Serial No. 505,453

6 Claims. (Cl. 172—120)

This invention relates to the manufacture of rotors for electric motors such as the squirrel cage rotors used in alternating current motors. The principal purpose of the invention is to provide a novel rotor and method of making the same whereby the cost of producing the rotors is materially reduced. My invention contemplates the manufacture of a rotor by compressing the powdered metal having the desired magnetic characteristics, for example, iron powder, within a sleeve of a suitable non-magnetic metal of high conductivity, for example, copper, the sleeve having slots therein into which the iron powder extends. In accordance with one form of the invention it is contemplated that the sleeve itself shall be composed of a powdered metal whereby the entire rotor unit is compressed in a single operation. The invention also contemplates providing a shaft mounting in the rotor as a part of the formation of the body of the rotor itself.

It is a particular purpose of the invention to provide a novel method of making rotors of the character above referred to which insures the uniform packing of the powdered metal used for the core of the rotor and which insures adequate filling of the slots in the nonmagnetic shell with the iron powder.

The features and advantages of the invention will appear more fully as the description proceeds in connection with the accompanying drawings wherein a preferred form of the invention is shown. It should be understood however that the drawings and description are illustrative only and are not to be taken as limiting the invention except insofar as it is limited by the claims.

In the drawings:

Figure 1 is a diagrammatic sectional view of a mold illustrating the initial step in the preparation of the rotor;

Figure 2 is a fragmentary sectional view similar to Figure 1 illustrating the second step in the formation of the rotor;

Figure 3 is a view similar to Figure 2 but illustrating a final compressing step in the formation of the rotor;

Figure 4 is a view in side elevation of a completed rotor;

Figure 5 is a plan view partly broken away of the rotor shown in Figure 4;

Figure 6 is a sectional view through a press illustrating a modification in the method of producing the rotor and a modification of the rotor itself;

Figure 7 is a sectional view taken on the line 7—7 of Figure 6;

Figure 8 is a diagrammatic sectional view showing the assembled rotor materials partially compressed; and Figure 9 is a perspective view of a loading fixture that is utilized in carrying out the method.

Referring now in detail to the drawings, the manner of making a rotor in accordance with the present invention consists in providing within a press suitable die holders such as 10 and 11 with a die block 12. A pair of opposed rams 13 and 14 are associated with the holders 10 and 11 and have head portions 15 and 16 which enter corresponding bores of the holders 10 and 11. The holders and the rams are aligned by suitable guide pins 17 and 18 mounted in the holders and adapted to receive the rams thereon. The rams desirably are provided with concave ends indicated at 19 and 20 and with inwardly projecting posts 21 and 22.

In one form of making the rotor I position the die assembly on one of the rams 14 with a suitable shim space 23 between the head of the ram 14 and the lower die holder 10 so as to limit the extent to which the ram will enter the holder 10. Within the die block 12 I place a cylindrical sleeve 24 of copper or other suitable non-magnetic electrically conductive material and within the sleeve I place a suitable iron powder 25 in a quantity sufficient to fill the space, as shown in Fig. 1, between the lower rams at 16 and the upper ram head 15. The sleeve 24 is slotted as indicated at 26 (see Figure 4) so that the powdered iron 25 may extend out to the outer periphery of the cylindrical sleeve 24.

The first step after securing the die block 12 as described above is to compress the powder 25 by applying pressure on the rams 13 and 14. This compresses the powder 25 from both ends and the projections 21 and 22 also aid in pressing the powder located in the middle of the body outwardly to facilitate filling the slots 26. The compression action is carried on to the extent indicated in Fig. 2 which is sufficient to enable them all to be opened and the article to be removed for sintering. The entire body is next sintered at a temperature of approximately 1800° F. after which it is placed in another mold indicated in Fig. 3 and the raised end portions 27 and 28 on the body of iron powder are further compressed so as to bring the ends of the iron powder plug flush with the surfaces of the die block 12 or beyond if it is necessary to overcome the shrinkage that results from sintering. The completed rotor appears, as shown in Figs. 4 and 5, as a solid, unitary body, the core of which comprises an iron powder and the shell of which comprises copper. The shell is unbroken circumferentially at both ends but the diagonal slots 26 form the necessary bars with the desired twist for a squirrel cage rotor.

Referring now to Figs. 6 to 9, inclusive, in this form of invention the same sort of die blocks and die holders are used but in this form of the invention the copper shell is also composed of powdered material and the shell is extended to form completely closed ends on the final rotor. In order to assemble the powdered materials as shown in Fig. 6 it is necessary to utilize a loading fixture 30 shown in perspective in Fig. 9 as comprising a very thin metal ring. This metal ring is bent to provide alternate outwardly and inwardly facing channels 31 and 32 on the peripheral surface thereof and these channels are twisted or spiraled about the axis of the fixture as indicated in Fig. 9. In filling the die block as shown in Fig. 6 a layer of powdered copper indicated at 33 is first placed in the bottom of the mold cavity and then the loading fixture 30 is put in place and the interior of it is filled with the iron powder 34 after which additional copper powder is filled in to fill the channels 31 as indicated at 35 in Fig. 6. The fixture is then removed by lifting and twisting the same after which an additional body of copper is filled in up to substantially the dotted line 36 in Fig. 6. There is of course some readjustment of the powder when the fixture 30 is removed but this is so slight as not to result in any serious displacement of the material. After the fixture is removed the powder is then compressed as illustrated in Fig. 8 and it may be sintered and recompressed if desired to give the final exact dimensions of the rotor.

It will be observed that in both forms of the invention the shell of the rotor is of copper and is slotted to provide necessary bars between the ends of the shell. The main distinction between the two forms of the invention lies in the fact that in the first form the shell is preformed and is used as a holder for the iron powder. In the second form of the invention the shell is composed of powdered metal which makes it necessary to utilize a loading fixture to maintain the separation of the two powders in filling the mold. The rotor shaft can of course be mounted in the openings left by the projection 21—22. A rotor of this character has the advantage that it is possible to make it by a direct molding operation thereby effecting a substantial reduction in cost of manufacture. It is also possible to treat the iron powder so as to obtain the desired electrical characteristics. In order to avoid the large eddy current losses that are encountered in pure iron I have slightly oxidized the iron powder so as to give the fine particles oxidized surfaces. It is possible also to actually insulate the iron powder particles with a ceramic type of insulator. Another modification of the iron content of the rotor is accomplished by including with the iron powder a small percentage of some foreign powder; for example, a rotor of 95% iron powder and 5% silicon powder may be used. The silicon has a tendency to make the carbon in the iron precipitate in the form of graphite, in which form it has a smaller effect on the magnetic properties than it has when combined with the iron to form cementite ($Fe_3C$).

From the foregoing description it is believed that the nature and advantages of the present invention will be readily apparent to those skilled in this art.

Having thus described my invention, what I claim as new and desire to secure by Letters Patent is:

1. A rotor unit for electric motors, comprising a cylindrically shaped shell composed of a conducting non-magnetic metal such as copper, and a body of compressed iron powder in said shell, the shell having longitudinally running slots in its periphery and the iron powder substantially filling said slots.

2. A rotor unit for electric motors, comprising a cylindrically shaped shell composed of a compressed powder of a conducting non-magnetic metal such as copper, and a body of compressed iron powder in said shell, the shell having longitudinally running slots in its periphery and the iron powder substantially filling said slots.

3. A rotor unit for electric motors, comprising a cylindrically shaped shell composed of a compressed and sintered powder of a conducting non-magnetic metal such as copper, and a body of compressed and sintered iron powder in said shell, the shell having longitudinally running slots in its periphery and the iron powder substantially filling said slots.

4. A rotor unit for electric motors, comprising a cylindrically shaped shell composed of a compressed powder of a conducting non-magnetic metal such as copper, and a body of compressed iron powder in said shell, the shell having longitudinally running slots in its periphery and the iron powder substantially filling said slots, the ends of said shell being composed of a compressed powder of the non-magnetic metal.

5. A rotor unit for electric motors comprising a cylindrically shaped shell composed of a conducting non-magnetic metal such as copper and a body of compressed magnetic metal powder in said shell, the shell being slotted in its periphery and the powder being extended substantially to the surface of the shell in said slots.

6. A rotor unit for electric motors comprising a cylindrically shaped shell of a conducting non-magnetic metal, a filler for such shell of a magnetic metal powder, the cylindrical periphery of said rotor being made up of alternate longitudinally running strips of non-magnetic metal and of the powder.

ALBERT F. HORLACHER.